(12) United States Patent
Barbara, Jr.

(10) Patent No.: US 6,193,290 B1
(45) Date of Patent: Feb. 27, 2001

(54) RAIL CAR COUPLING KNUCKLE CARRYING DEVICE

(76) Inventor: Joseph A. Barbara, Jr., 7316 Suder, Erie, MI (US) 48133

( * ) Notice: Subject to any disclaimer, the term of this patent is extended or adjusted under 35 U.S.C. 154(b) by 0 days.

(21) Appl. No.: 09/229,274

(22) Filed: Jan. 13, 1999

Related U.S. Application Data

(60) Provisional application No. 60/071,268, filed on Jan. 13, 1998.

(51) Int. Cl.$^7$ ..................................................... B65G 7/12
(52) U.S. Cl. ............................................ 294/15; 294/158
(58) Field of Search .................................. 294/15, 82.21, 294/82.23, 137, 147, 157, 158, 168; 224/255, 270

(56) References Cited

U.S. PATENT DOCUMENTS

| | | | |
|---|---|---|---|
| 1,234,781 | * | 7/1917 | Lozier ................................ 294/82.23 |
| 2,515,826 | * | 7/1950 | Hall ........................................ 294/168 |
| 3,955,733 | * | 5/1976 | Russell ................................. 294/158 |
| 4,045,067 | * | 8/1977 | Wieder et al. ......................... 294/15 |
| 4,759,578 | * | 7/1988 | Gonzalez ............................... 294/15 |
| 5,263,755 | * | 11/1993 | Thompson ........................... 294/137 |
| 5,704,667 | * | 1/1998 | Lin ......................................... 294/15 |
| 5,899,514 | * | 5/1999 | York et al. ............................ 294/158 |

* cited by examiner

*Primary Examiner*—Dean J. Kramer
(74) *Attorney, Agent, or Firm*—MacMillan, Sobanski & Todd, LLC

(57) ABSTRACT

A device for carrying a rail car coupling knuckle. The device includes an open end, a closed end and a retaining pin for securing the open and closed ends together. The open end includes a pair of substantially parallel tubes that are fixedly attached to a metal plate. Preferably, the tubes have substantially equal inner diameters. One of the tubes has a flange near one end and an opening near the other end. The closed end includes a pipe and a tube that are fixedly attached to a metal plate. Preferably the pipe and the tube of the closed end is substantially parallel to each other so as to be in alignment with the tubes of the open end. The outer diameter of the pipe of the closed end is slightly smaller than the inner diameter of the tube of the open end. Likewise, the outer diameter of the other tube of the open end is slightly smaller than the inner diameter of the tube of the closed end. In this manner, the pipe of the closed end can be inserted into the tube of the open end, and the tube of the open end can be inserted inside the tube of the closed end while one of the tubes supports the rail car coupling knuckle. The retaining pin can be inserted into openings in the tubes to hold the open and closed ends together while carrying the rail car coupling knuckle.

17 Claims, 4 Drawing Sheets

US 6,193,290 B1

RAIL CAR COUPLING KNUCKLE CARRYING DEVICE

CROSS-NOTING TO RELATED APPLICATIONS

This application claims the benefit of U.S. Provisional Application No. 60/071,268 filed Jan. 13, 1998.

BACKGROUND OF THE INVENTION

This invention relates in general to a carrying device, and in particular, to a device that facilitates the carrying of a rail car coupling knuckle.

The device which detachably connects one rail car to another is called a rail car coupling knuckle. Rail car coupling knuckles have a tendency to become damaged or broken while a train is in transit or in the process of changing cars and/or adding cars to the train. Thus, rail car coupling knuckles are replaced often by railroad personnel.

As all railroad personnel know, it is difficult and dangerous to carry a rail car coupling knuckle because rail car coupling knuckles are extremely heavy and difficult to grasp when carrying from the place of storage to the repair point. Thus, it is desirable to provide a rail car coupling knuckle carrying device to more safely carry the rail car coupling knuckle and decrease the number of injuries to railroad personnel.

SUMMARY OF THE INVENTION

This invention relates to a device for carrying a rail car coupling knuckle. The rail car coupling knuckle carrying device comprises an open end, a closed end, and a retaining pin for holding the open end and closed end together. The open end includes a plate and first and second tubes fixedly attached to the plate and are preferably substantially parallel to each other. One of the first and second tubes is capable of receiving the rail car coupling knuckle. The closed end includes a plate and a post and a third tube. The post and the third tube are fixedly attached to the plate and are preferably substantially parallel to each other. The post of the closed end is capable of being received in one of the first and second tubes of the open end, and the third tube of the closed end is capable of being received in the other one of the first and second tubes of the open end. The retaining pin, which can be generally L-shaped or generally U-shaped is inserted through openings in the open and closed ends to securely hold them together.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
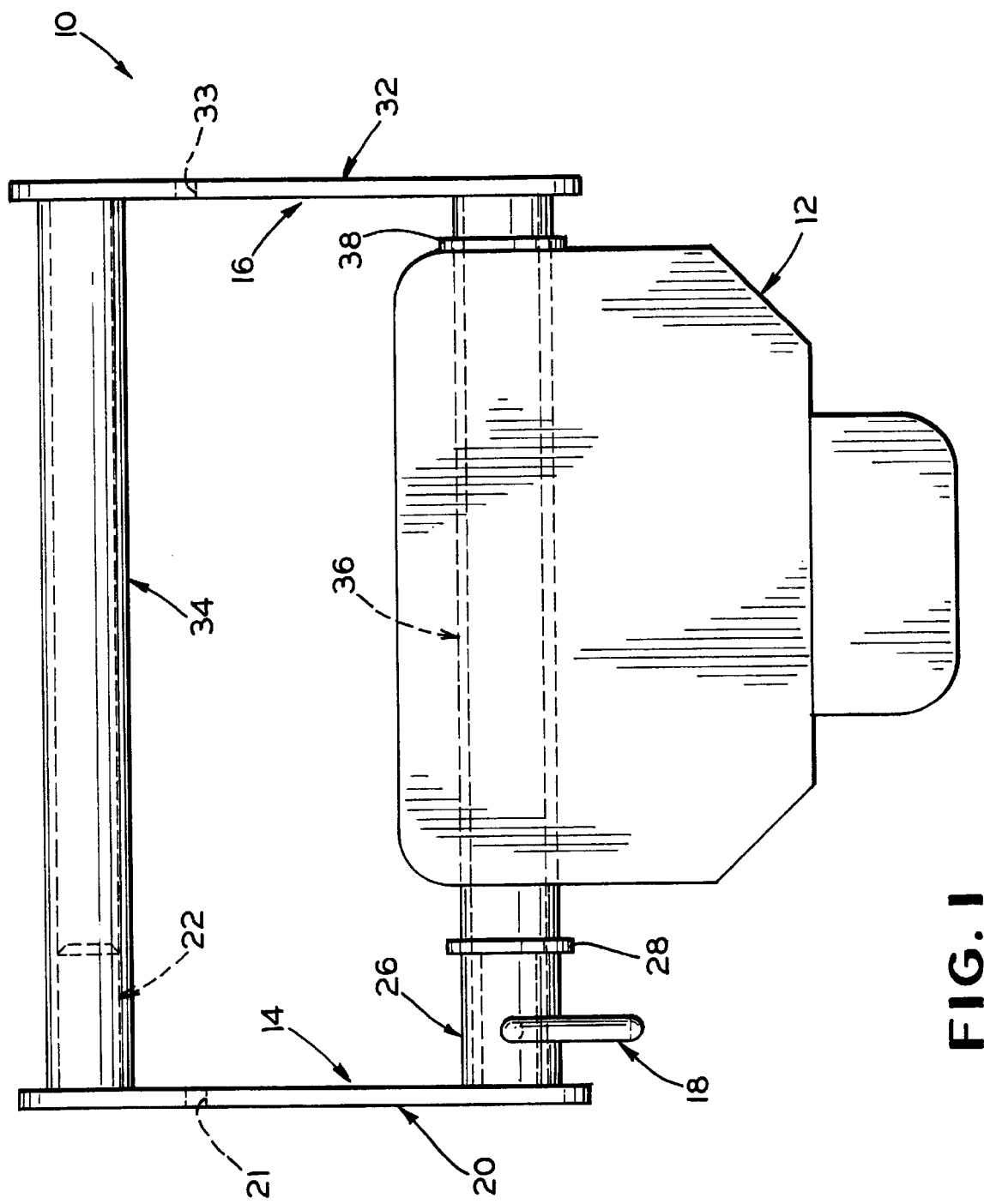
FIG. 1 is a front elevational view of the device for carrying a rail car coupling knuckle according to a preferred embodiment of the invention.

Referring now to the drawings, there is illustrated in FIG. 1 a device, shown generally at 10, for carrying a rail car coupling knuckle 12 according to a preferred embodiment of the invention. In general, the device 10 includes a first or closed end 14 and a second or open end 16 held together by a retaining pin 18.

Figure 3:
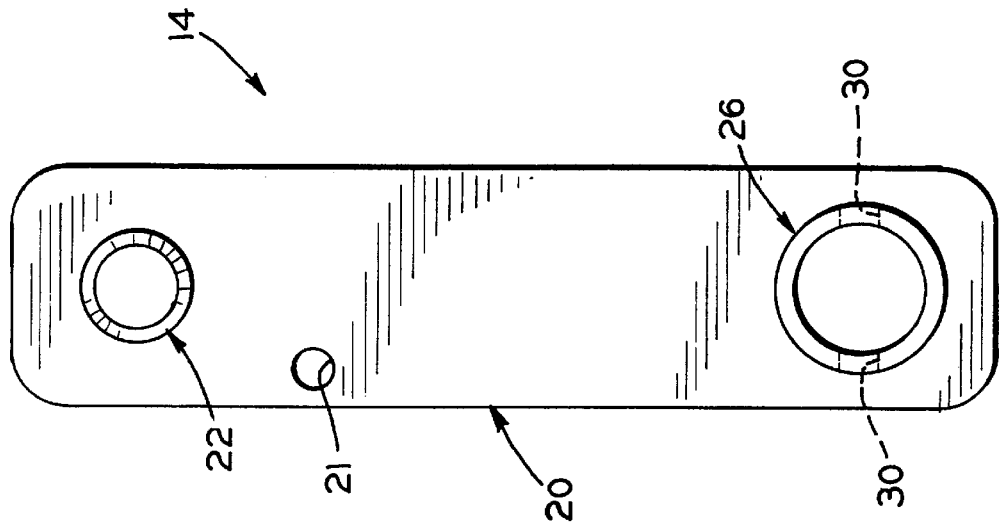
FIG. 3 is an end elevational view of the closed end of FIG. 2.
Figure 2:
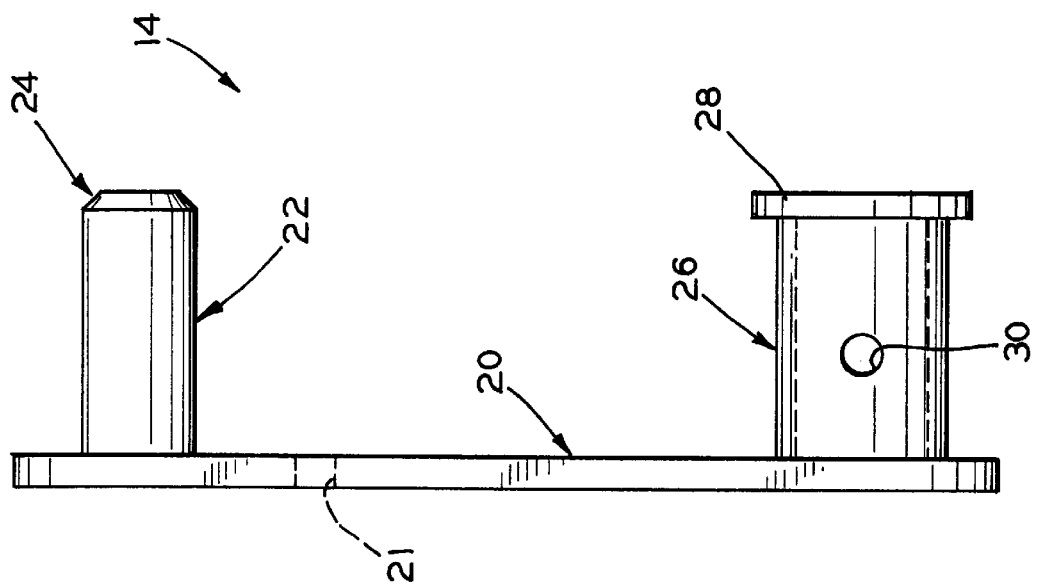
FIG. 2 is a front elevational view of the closed end of the device of FIG. 1.

Referring now to FIGS. 2 and 3, the closed end 14 includes a plate 20 made of ¼" steel stock or other suitably rigid material. The plate 20 is generally rectangular and preferably has slightly rounded corners to prevent injury to railroad personnel when accidentally hitting the corners of the closed end 14. The metal plate 20 may include at least one aperture 21 for attaching one end of a shoulder strap (not shown) or other similar means for facilitating carrying the device 10.

One end of the closed end 14 includes a generally solid tube or pipe 22 fixedly attached to the metal plate 20. The pipe 22 may be fixedly attached to the metal plate 20 by using means well known in the art, such as welding, and the like. The pipe 22 preferably has an outer diameter slightly smaller than the inner diameter of the tube 34 of the open end 16. The pipe 22 may include a beveled end portion 24 to facilitate inserting the pipe 22 into the tube 34 of the open end 16.

The other end of the closed end 14 includes a generally pipe or hollow tube 26 fixedly attached to the metal plate 20. Preferably, the tube 26 is substantially parallel to the pipe 22. Similar to the pipe 22, the hollow tube 26 may be fixedly attached by using means well known in the art, such as welding, and the like. The hollow tube 26 preferably has an inner diameter slightly larger then the outer diameter of the tube 36 of the open end 16. The hollow tube 26 includes a flange 28 and an opening 30 through opposite walls of the hollow tube 26, the purpose of which is described below.

Figure 4:
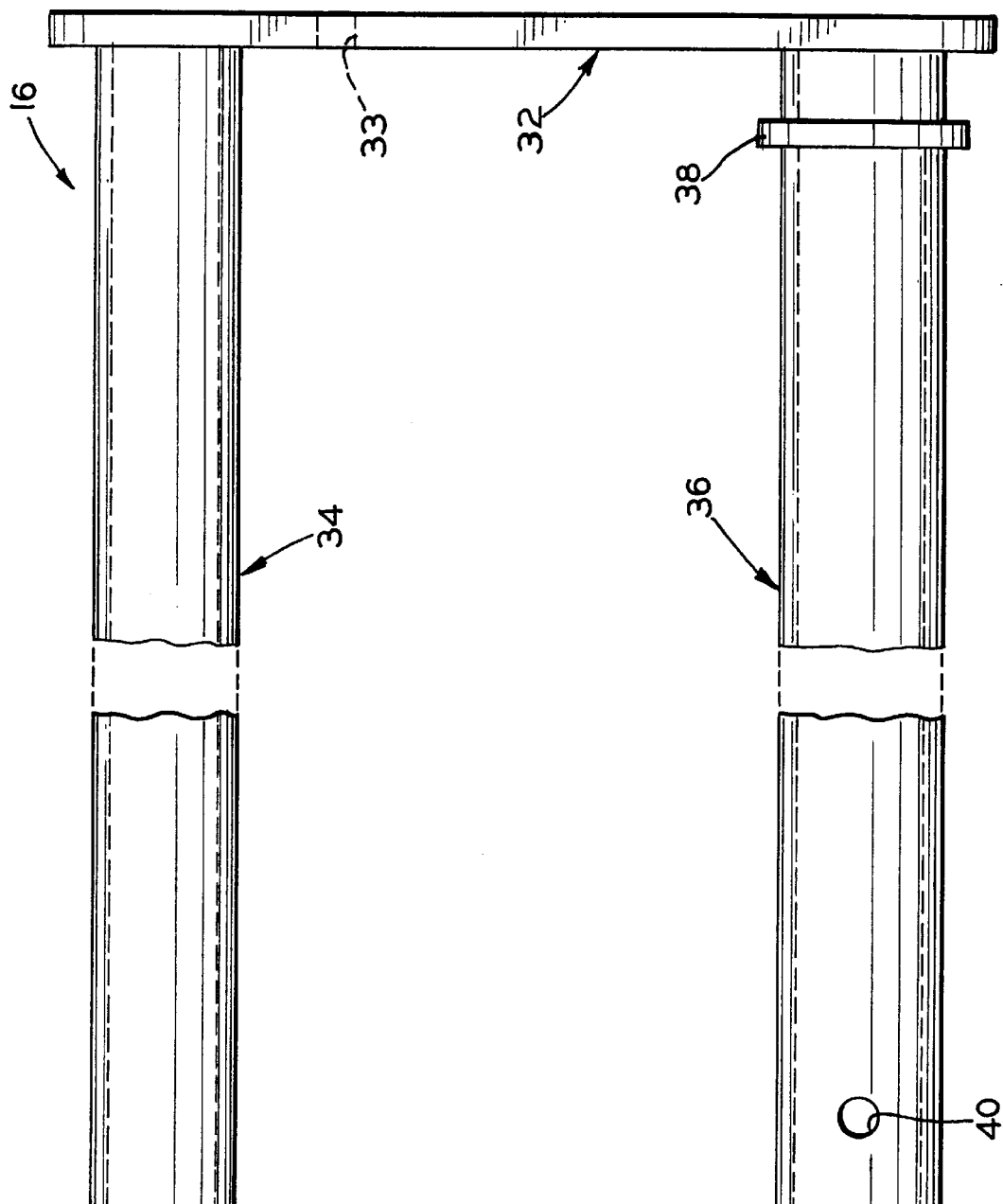
FIG. 4 is a front elevational view of the open end of the device of FIG. 1.
Figure 5:
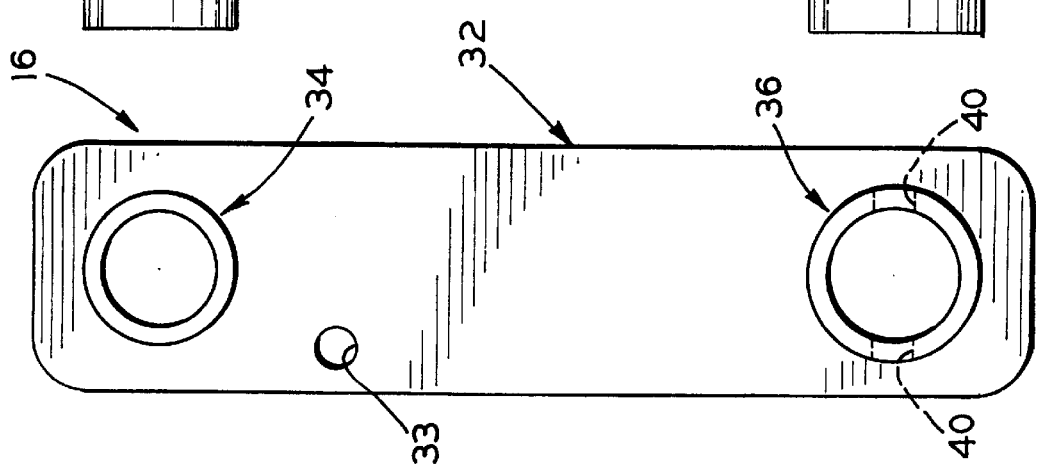
FIG. 5 is an end elevational view of the open end of FIG. 4.

Referring now to FIGS. 4 and 5, the open end 16 includes a plate 32 made of ¼" steel stock or other suitably rigid material. Similar to the plate 20, the plate 32 is generally rectangular and preferably has slightly rounded corners to prevent injury to railroad personnel when accidentally hitting the corners of the open end 16. The metal plate 32 may include at least one aperture 33 for attaching the other end of the shoulder strap (not shown) or other similar means for facilitating carrying the device 10.

One end of the open end 16 includes a generally hollow pipe or tube 34 fixedly attached to the metal plate 32. The tube 34 may be fixedly attached to the metal plate 32 by using means well known in the art, such as welding, and the like. The tube 34 preferably has an inner diameter slightly larger than the outer diameter of the pipe 22 of the closed end 14.

The other end of the open end 16 includes a generally hollow pipe or tube 36 fixedly attached to the metal plate 32. Preferably, the tube 36 is substantially parallel to the tube 34. Similar to the tube 34, the hollow tube 36 may be fixedly attached by using means well known in the art, such as welding, and the like. The hollow tube 36 preferably has an outer diameter slightly smaller then the inner diameter of the tube 26 of the closed end 14. The hollow tube 36 includes a flange 38 and an opening 40 through opposite walls of the hollow tube 36. Preferably, the opening 40 of the open end 16 has a diameter approximately equal to the opening 30 of the closed end 14.

Figure 6:
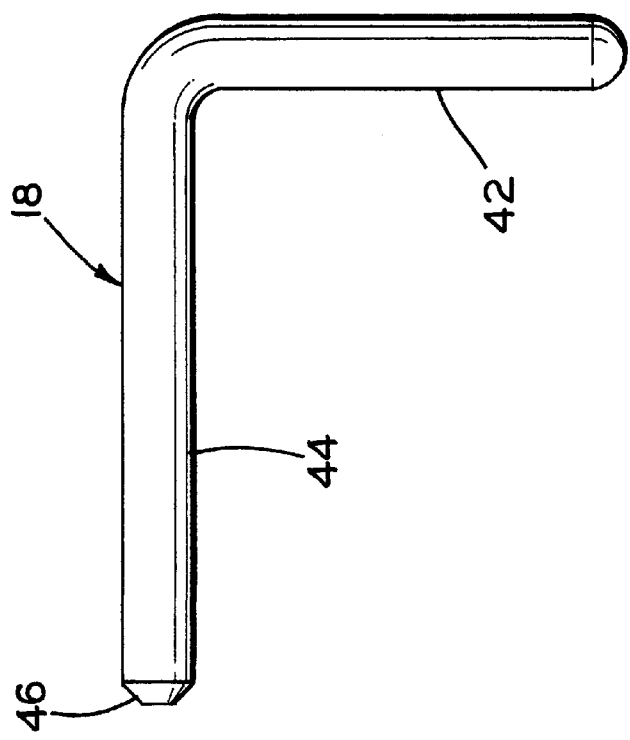
FIG. 6 is a front elevational view of a retaining pin of the device.

Referring now to FIG. 6, there is illustrated a retaining pin 18 of the device 10. In one preferred embodiment of the invention, the retaining pin 18 may be generally an L-shaped solid piece of solid metal having a handle portion 42 and an elongated portion 44 of sufficient length to pass through the openings 30 and 40 of the open and closed ends 14 and 16. The elongated portion 44 may terminate at a beveled end 46 to facilitate inserting the retaining pin 18 through the openings 30 and 40.

Figure 7:
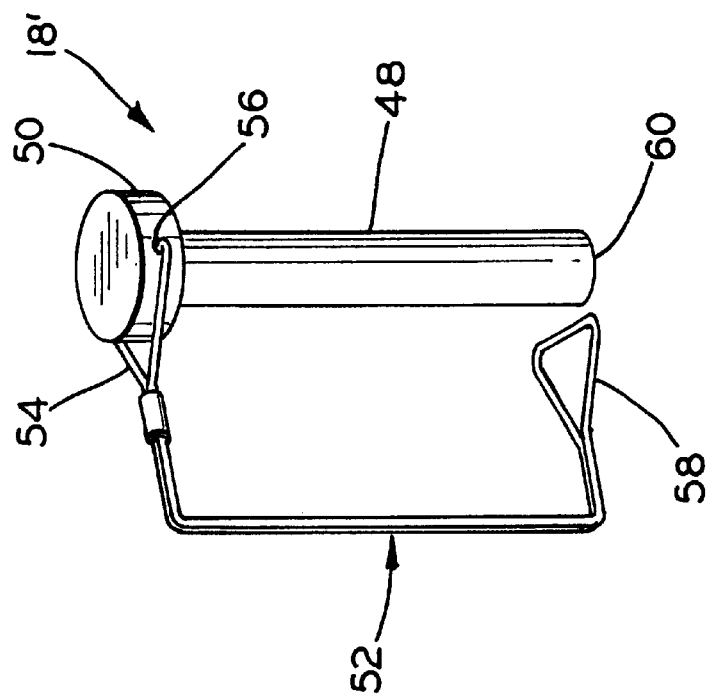
FIG. 7 is a front elevational view of another retaining pin of the device.

It should be appreciated that the retaining pin 18 may be any suitable fastening device for securely holding the closed end 14 and the open end 16 together. FIG. 7 illustrates a retaining pin 18' according to an alternative embodiment of the invention. In this embodiment, the retaining pin 18' includes a solid, cylindrical body portion 48 for inserting through the openings 30 and 40 of the open and closed ends 14 and 16. One end of the body potion 48 terminates at a cylindrical head 50 having a diameter larger than the body portion 48 so as to abut against the tube 26 of the closed end 14. The retaining pin 18' also includes a generally U-shaped harness 52 made of round, flexible metal of a type well-known in the art. The harness 52 includes a triangular-shaped upper clasp portion 54 that is pivotally received through an opening 56 in the head 50.

The harness 52 also includes a substantially similar triangular-shaped lower clasp portion 58. The dimensions of the triangular-shaped lower clasp portion 58 should be such that the body portion 48 can be received within the clasp portion 58. Preferably, the distance between the upper clasp portion 54 and the lower clasp portion 58 is less than the length between the opening 56 and the end 60 of the body portion 48. In this manner, a biasing force can be applied to flex the lower clasp portion 58 so that the body portion 48 can be received within the lower clasp portion 58. After the biasing force is removed, the lower clasp portion 58 will return to it's original, non-flexed state to retain the body portion 48 within the triangular-shaped lower clasp portion 58.

To use the rail car coupling knuckle carrying device 10, the retaining pin 18 or 18' is first removed from the openings 30 and 40. Of course, if the open and closed ends 14 and 16 are already separated, this step is not necessary. Next, the open and closed ends 14 and 16 are separated from each other by pulling both ends apart such that the pipe 22 is no longer received in the tube 34 and the tube 36 is no longer received in the tube 26. Then, the tube 36 is inserted through the rail car coupling knuckle 12, as shown in FIG. 1. Next, the pipe 22 is inserted into the tube 34 of the open end 16, and the tube 36 is inserted into the tube 26 of the closed end 14 such that the openings 30 and 40 are aligned. Then, the retaining pin 18, 18' is inserted into the openings 30 and 40 to securely hold the closed and open ends 14 and 16 together. The railroad personnel can then easily carry the rail car coupling knuckle 12 by grasping the tube 34 or by using a carrying strap (not shown) attached to the openings 21 and 33. It should be noted that the flanges 28 and 38 on the closed and open ends 14 and 16, respectively, act as stops to prevent the rail car coupling knuckle 12 from sliding on the tube 36 while it is being carried by the railroad personnel. Removal of the rail car coupling knuckle 12 can be achieved by performing the reverse procedure.

In the preferred embodiment, the post 22 and the tube 26 of the closed end 14 and substantially parallel to each other. In addition, the tubes 34 and 36 of the open end 16 are also substantially parallel to each other. In this manner, the post 22 is substantially aligned with the tube 34, and the tube 26 is substantially aligned with the tube 36. However, it should be appreciated that the invention can be practiced with any arrangement in which the post 22 and the tube 26 of the closed end 14 are in substantial alignment with the tube 34 and the tube 36 of the open end 16.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A rail car coupling knuckle carrying device, comprising:

an open end;

a closed end; and a retaining pin for holding the open end and closed ends together, wherein the open end includes a plate and first and second tubes fixedly attached to the plate, one of the first and second tubes being capable of receiving the rail car coupling knuckle, and wherein one of the first and second tubes includes a flange.

2. The carrying device according to claim 1, wherein the first and second tubes of the open end are substantially parallel to each other.

3. The carrying device according to claim 1, wherein the closed end includes a plate and a post and a third tube, the post and the third tube being fixedly attached to the plate.

4. The carrying device according to claim 3, wherein the post and the third tube of the closed end are substantially parallel to each other.

5. The carrying device according to claim 3, wherein the post of the closed end is capable of being received in one of the first and second tubes of the open end, and wherein the other one of the first and second tubes of the open end is capable of being received in the third tube of the closed end.

6. The carrying device according to claim 3, wherein the third tube includes a flange.

7. The carrying device according to claim 1, wherein the retaining pin is generally L-shaped.

8. The carrying device according to claim 1, wherein the retaining pin includes a generally U-shaped harness.

9. A method of carrying a rail car coupling knuckle by using a carrying device, the device comprising an open end having first and second tubes, a closed end having a post and a third tube, and a retaining pin for securing the open and closed ends together, the method comprising the steps of:

inserting the first tube of the open end through the rail car coupling knuckle and into the third tube of the closed end;

inserting the post of the closed end into the second tube of the open end; and inserting the retaining pin through openings in the open and closed ends.

10. A rail car coupling knuckle carrying device, comprising:

an open end;

a closed end; and a retaining pin for holding the open end and closed ends together, wherein the closed end includes a plate and a post and a third tube, the post and the third tube being fixedly attached to the plate, and wherein one of the post and third tube includes a flange.

11. The carrying device according to claim 10, wherein the open end includes a plate and first and second tubes fixedly attached to the plate, one of the first and second tubes being capable of receiving the rail car coupling knuckle.

12. The carrying device according to claim 11, wherein the first and second tubes of the open end are substantially parallel to each other.

13. The carrying device according to claim 11, wherein one of the first and second tubes includes a flange.

14. The carrying device according to claim 10, wherein the post and the third tube of the closed end are substantially parallel to each other.

15. The carrying device according to claim 10, wherein the post of the closed end is capable of being received in one of the first and second tubes of the open end, and wherein the other one of the first and second tubes of the open end is capable of being received in the third tube of the closed end.

16. The carrying device according to claim 10, wherein the retaining pin is generally L-shaped.

17. The carrying device according to claim 10, wherein the retaining pin includes a generally U-shaped harness.

* * * * *